United States Patent [19]

Takeshige

[11] Patent Number: 5,581,711
[45] Date of Patent: Dec. 3, 1996

[54] METHOD AND APPARATUS FOR DETERMINING THE NUMBER OF WORDS OF TRANSFERRED DATA IN A DIGITAL DATA TRANSFER SYSTEM

[75] Inventor: Masayuki Takeshige, Kasugai, Japan

[73] Assignees: Fujitsu Limited, Kawasaki; Fujitsu VLSI Limited, Kasugai, both of Japan

[21] Appl. No.: 529,174

[22] Filed: Sep. 15, 1995

Related U.S. Application Data

[63] Continuation of Ser. No. 204,498, Mar. 2, 1994, abandoned.

[30] Foreign Application Priority Data

Mar. 19, 1993 [JP] Japan ................................. 5-060767

[51] Int. Cl.⁶ ..................................................... G06F 13/00
[52] U.S. Cl. ........................ 395/280; 395/309; 364/242.3
[58] Field of Search ....................................... 395/280, 309

[56] References Cited

U.S. PATENT DOCUMENTS

| | | | |
|---|---|---|---|
| Re. 33,632 | 7/1991 | Nakamura et al. | 358/261.1 |
| 5,003,465 | 3/1991 | Chisholm et al. | 395/275 |
| 5,086,500 | 2/1992 | Greub | 395/550 |
| 5,119,487 | 6/1992 | Taniai et al. | 395/425 |
| 5,142,628 | 8/1992 | Okochi et al. | 395/325 |
| 5,151,999 | 9/1992 | Marzucco et al. | 395/800 |
| 5,287,471 | 2/1994 | Katayose et al. | 395/425 |
| 5,305,441 | 4/1994 | Okochi et al. | 395/325 |
| 5,325,489 | 6/1994 | Mitsuhira et al. | 395/275 |
| 5,386,532 | 1/1995 | Sodos | 395/425 |

*Primary Examiner*—Krisna Lim
*Attorney, Agent, or Firm*—Staas & Halsey

[57] ABSTRACT

An apparatus and method for transferring digital data is herein disclosed using a central processing unit and a direct memory access controller. Based on the control of the central processing unit, a direct memory access controller counts the number of words stored in a memory device by determining the number and position of the bytes contained in the words comprising the data to be transferred.

9 Claims, 6 Drawing Sheets

| Lower Two Bits of Byte Number | K | L |
|---|---|---|
| 0 1 | 0 | 0 |
| 1 0 | 0 | 1 |
| 1 1 | 1 | 0 |
| 0 0 | 1 | 1 |

I = 0 0 1 1
J = 0 1 0 1

BT1  BT2  BT3  BT4

```
P  =  0  0  0  0  1  1  1  1
Q  =  0  0  1  1  0  0  1  1
R  =  0  1  0  1  0  1  0  1
```

BT1 BT2 BT3 BT4 BT5 BT6 BT7 BT8

| Lower Three Bits of Byte Number | | | X | Y | Z |
|---|---|---|---|---|---|
| 0 | 0 | 1 | 0 | 0 | 0 |
| 0 | 1 | 0 | 0 | 0 | 1 |
| 0 | 1 | 1 | 0 | 1 | 0 |
| 1 | 0 | 0 | 0 | 1 | 1 |
| 1 | 0 | 1 | 1 | 0 | 0 |
| 1 | 1 | 0 | 1 | 0 | 1 |
| 1 | 1 | 1 | 1 | 1 | 0 |
| 0 | 0 | 0 | 1 | 1 | 1 |

5,581,711

METHOD AND APPARATUS FOR DETERMINING THE NUMBER OF WORDS OF TRANSFERRED DATA IN A DIGITAL DATA TRANSFER SYSTEM

This application is a continuation of application Ser. No. 08/204,498, filed Mar. 2, 1994, now abandoned.

BACKGROUND OF THE INVENTION

1. Field of the Invention

The present invention relates generally to a data transfer device and method that transfers digital data between data processing devices.

2. Description of the Related Art

In a data processing device formed with a micro processor unit (hereinafter referred to as MPU) and peripheral circuits, it is desirable to utilize circuit designs which most efficiently transfer data between the MPU and peripheral circuitry. When large amounts of data are to be transferred to or from sequential memory locations concurrently with the running of a main program, it is not feasible to use an interrupt system because it requires too much time for service by the software subroutine. This problem is solved in many computer systems through the use of a Direct Memory Access Controller (hereinafter referred to as DMAC). With DMACs, every time a peripheral is ready to transfer a data word, the DMAC signals the computer, and without disturbing the computer or an associated accumulator, the main program instruction stream is delayed one memory cycle while hardware logic completes the data transfer. Thus, the main advantage of using DMACs is that the data transfer occurs independently of the main program without the use of software.

Since DMACs generally do not employ software routines, the following general hardware design aspects have, in the past, been widely used to implement a DMAC. First, an address register must be designed to point to memory locations that are intended to receive or transmit data. Second, a method must be designed to increment the address register so that a sequential group of memory locations can take part in the data transfer operation. Third, a method must be devised to determine when the last memory location has been served. Fourth, a data buffer must be included to serve as a temporary storage register for data as the data is transferred between the memory buffer and the peripheral. Fifth, control signals must be provided to the computer from the DMAC to let the computer know when service is required as well as to indicate whether data is being transferred to or from a peripheral.

Each of data to be transferred has a length of several bytes. The data stored in the buffer memory is read out and transferred in a word to word manner according to the number of bytes of data stored therein, e.g., four bytes. The MPU then converts the number of bytes in the inputted data and transmits the converted data, in order to increase the transfer efficiency.

During data transfer operations, it is oftentimes desirable to store bytes located in the middle of the data to a location in the buffer memory first, rather than starting by storing the top byte thereof first. Often, when operations for storing data are carried out by first transferring bytes located in the middle of each word, the actual number of words to be transferred varies according to the number of bytes comprising the stored data. For example, if one word has four bytes, and the data to be stored has four bytes and if the data is sequentially stored from the top byte thereof, the data oftentimes forms one word. If the data is stored beginning with the byte located in the middle of word, the number of words formed therefrom is oftentimes two words. Regardless, when the data stored in the buffer memory is transferred into another memory via the DMAC, it is necessary to compute the number of words to be transferred.

However, in order to compute the number of words of stored data, the DMAC many times has to incorporate a large scale logic circuit. This frequently causes a reduction in data processing speed, as well as an increase in the circuit area occupied by the DMAC. Also, if the data to be transferred is consistently written from the top byte of each word into the buffer memory, the entire capacity of buffer memory will not be efficiently utilized.

SUMMARY OF THE INVENTION

It is therefore an object of the present invention to provide a data processing device and method which includes a simple circuit for computing the number of words of data having an arbitrary number of bytes that are written from the byte positioned in the middle of a word of data, in order to increase a data transfer speed.

To achieve this object, and in accordance with the purpose of the present invention, a data transfer apparatus for transferring digital data organized into a given number of words is proposed where the words are composed of a plurality of bytes, with the apparatus comprising a central processing unit for controlling the transfer of the data, a transfer device controlled by the central processing unit for executing the transfer of said data, a plurality of storage devices to which said data may stored (i.e. written to or read from), and a bus for coupling the central processing unit, the transfer device, and each of the storage devices. A calculator is provided with the transfer device for calculating the number of words of said transferred data based on the number of bytes contained in each of said words, the number of bytes comprising said data to be transferred, and the byte position occupied by said data within said words stored in each of said storage devices. The byte position in each word is determined by the central processing unit.

BRIEF DESCRIPTION OF THE DRAWINGS

The features of the present invention that are believed to be novel are set forth with particularity in the appended claims. The invention, together with objects and advantages thereof, may be best understood by reference to the following description of the preferred embodiments together with the accompanying drawings, in which:

DESCRIPTION OF THE PREFERRED EMBODIMENT

Figure 1:
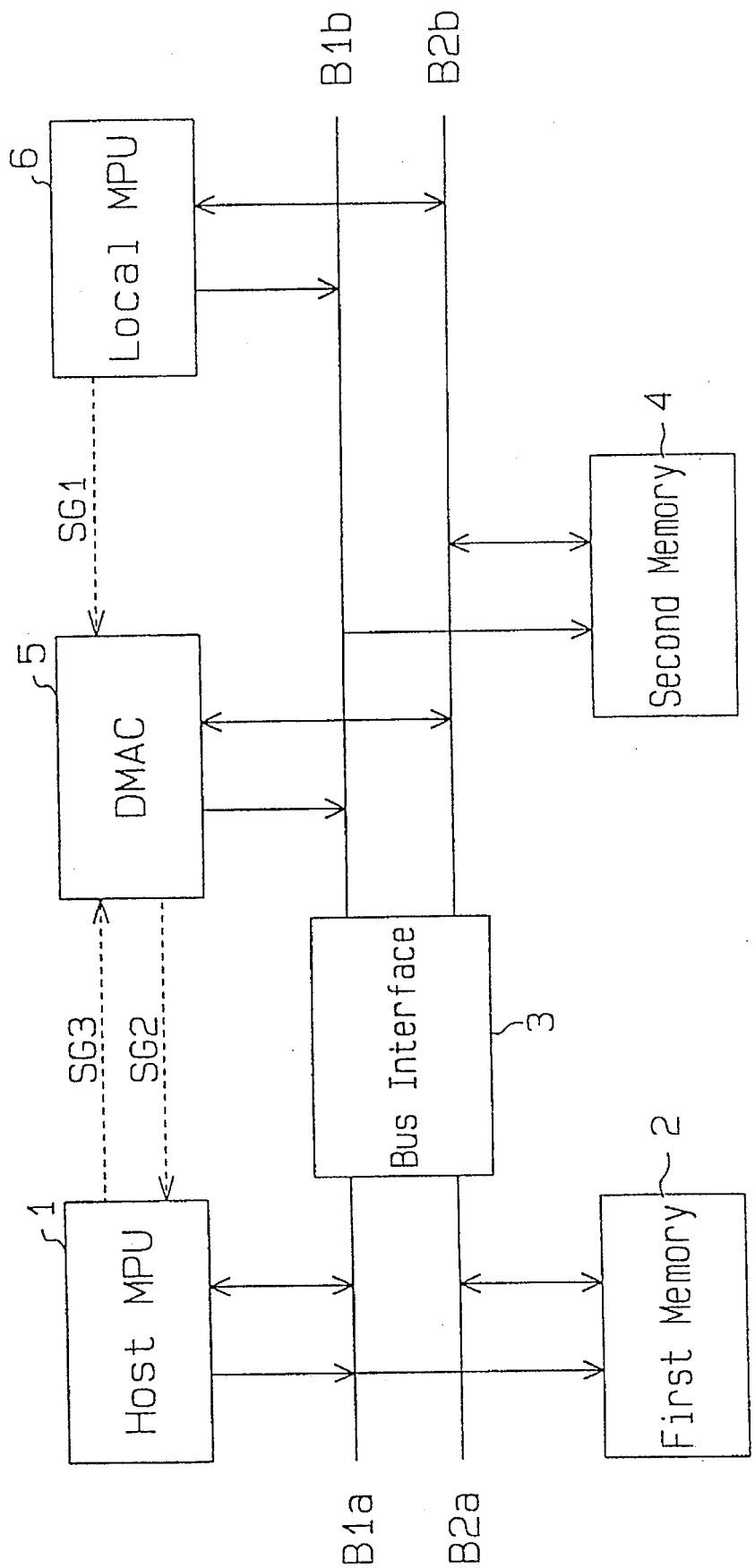
FIG. 1 is a block diagram of a data processing device according to the preferred embodiment of the present invention.

A preferred embodiment of the present invention will now be described. FIG. 1 shows a data processing device. A host MPU 1 and a first memory 2 couple with data bus lines B1a, B2a, respectively. A bus interface 3 couples with the data bus lines B1a, B2a. A second memory 4, DMAC 5, and a local MPU 6 are coupled with the bus interface 3, via the data bus lines B1b, B2b.

One example of operation carried out by the data processing device having the above-described structure will now be explained. The local MPU 6 starts writing a processed data by byte units, from an arbitrary byte into the second memory 4. When the data capacity of the second memory 4 exceeds a predetermined amount, the local MPU 6 outputs an activation signal SG1 to the DMAC 5. The local MPU 6 transmits simultaneously the activation signal SG1, a top address of the written data, a byte position indicating a first effective data within the written data, and the number of bytes to the DMAC 5. The DMAC 5 outputs a request signal SG2 to the host MPU 1 for requesting the usage of bus lines. When the host MPU 1 outputs an acknowledge signal SG3 to the DMAC 5 for permitting the usage of the bus lines, based upon the request signal SG2, the DMAC 5 transfers data stored in the second memory 4 by one word unit, to the first memory 2.

Figure 2:
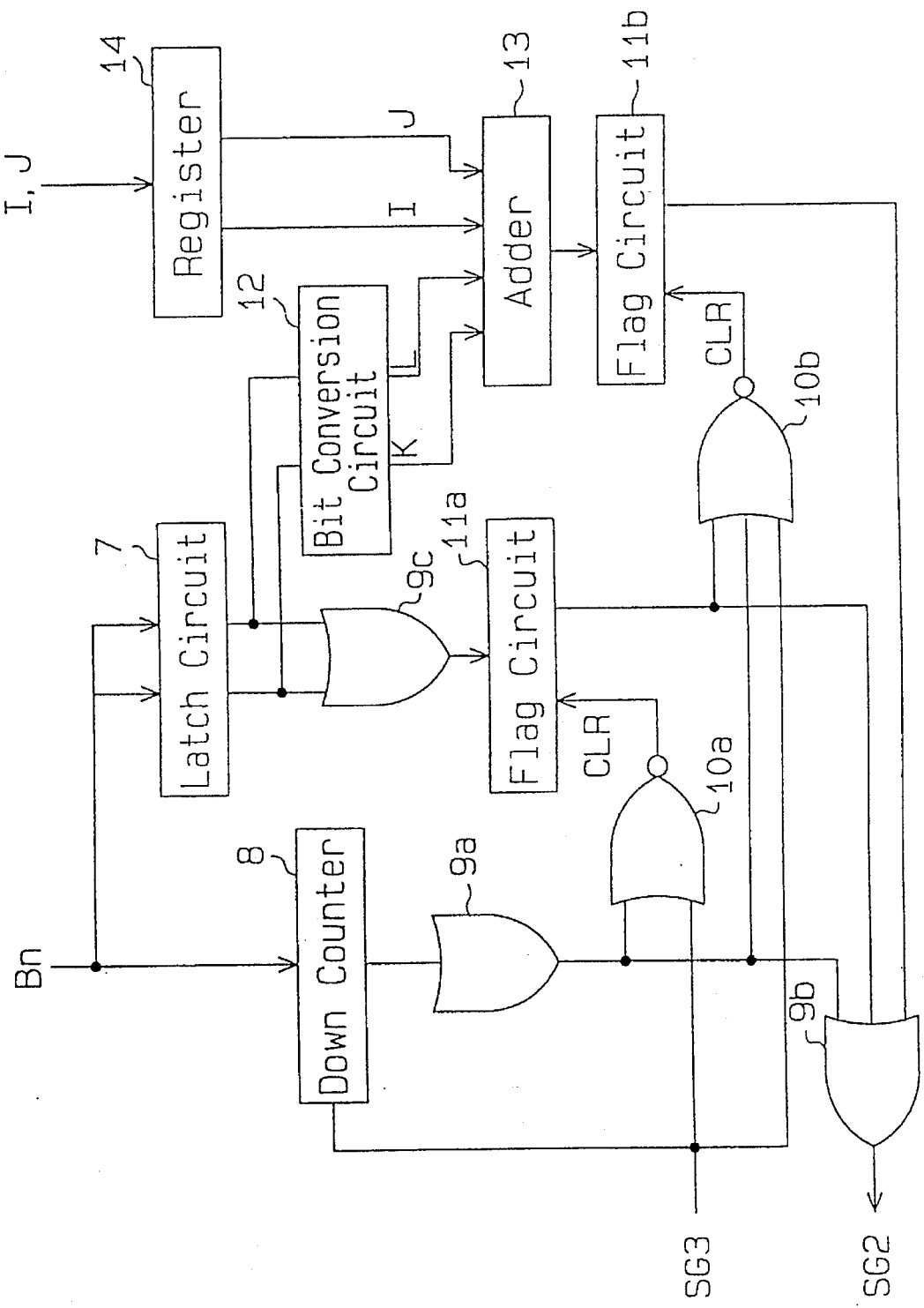
FIG. 2 is a block diagram showing an example of a circuit for computing the number of words of data stored in memory according to the preferred embodiment of the present invention.

The DMAC 5 includes a circuit for computing the number of words of data stored in the first memory 2 or the second memory 4. FIG. 2 shows an example of a circuit for computing the number of words. The number of bytes of data written in the first memory 2 or the second memory 4 is converted into the respective binary number for defining a signal Bn that represents the number of bytes output from the local MPU 6. If the written data is formed with four bytes, the respective binary number will be "100". If the written data is formed with six bytes, the binary number will be "110". When one word is formed with four bytes, the lower two bits of signal Bn are coupled to a latch circuit 7 and latched therein. The upper bits of signal Bn excluding the lower two bits, i.e. a remainder amount of upper bits, are stored in a down-counter 8. Whenever the down-counter 8 receives a low level acknowledge signal SG3 from the host MPU 1, the counter 8 subtracts "1" from the stored data. An output signal from the counter 8 is coupled to an OR gate 9a. An output signal from the OR gate 9a is coupled to a NOR gate 10a and an OR gate 9b, respectively. An output signal having a high (hereinafter referred to as H) level from the OR gate 9b is output to the host MPU 1 as a request signal SG2. An acknowledge signal SG3 is coupled to the NOR gate 10a. When the NOR gate 10a receives a low (hereinafter referred to as L) level acknowledge signal SG3 and an L level output from the OR gate 9a, the NOR gate 10a outputs an H level clear signal CLR to a flag circuit 11a.

Figures 3, 4:
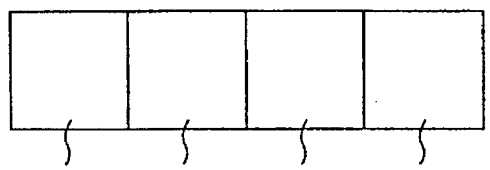
FIG. 3 is an explanatory conversion table for a bit converting circuit that is utilized when one word is formed with four bytes.
FIG. 4 is an explanatory conversion table for generating a signal for determining a written position utilized when one word is formed with four bytes.

The latch circuit 7 outputs the stored data that is formed with two bits to an OR gate 9c and a bit conversion circuit 12. An output signal from the OR gate 9c is coupled to the flag circuit 11a. When the flag circuit 11a receives an H level output signal from the OR gate 9c, the flag circuit 11a outputs an H level flag signal (i.e., "1") to the OR gate 9b. When the flag circuit 11a receives an H level clear signal CLR from the NOR gate 10a, the flag circuit 11a eliminates a flag having an H level. The bit conversion circuit 12 converts an output signal having two bits from the latch circuit 7 (i.e., lower two bits of signal Bn representing the number of bytes) into respective two-bit signals K, L, as shown in FIG. 3, and transmits the converted signals K, L to an adder 13. Converting operation carried out by the circuit 12 is for outputting a value that represents the result of subtraction when "1" is subtracted from the lower two bits of signal Bn, or for outputting a value equal to "11" when the lower two bits are equal to "00".

A register 14 stores two-bit signals I, J indicating written positions that are output from the local MPU 6. The signals I, J are set as two-bit signals that have sequentially values "00", "01", "10", "11" from the top to bottom, with respect to four byte positions BT1 through BT4 that form one word, as shown in FIG. 4, respectively. The two-bit signals I, J output from the register 14 are coupled to adder 13. The adder 13 adds the two-bit output signals K, L from the circuit 12 with the two-bit output signals I, J from the register 14. If the result of addition includes a carry-over (i.e., increase the number of figures), the adder 13 outputs "1" to a flag circuit 11b. If no carry-over, the adder 13 outputs "0" to the circuit 11b. The flag circuit 11b sets a flag to "1", based upon the output signal having "1" from the adder 13, and transmits the set flag to the OR gate 9b.

Output signals from the OR gate 9a and flag circuit 11a, and acknowledge signal SG3 are coupled to a NOR gate 10b. An output signal from the NOR gate 10b is coupled to the flag circuit 11b. When the output signals from the OR gate 9a and flag circuit 11a go low, and a low level acknowledge signal SG3 is coupled to the NOR gate 10b, a high level clear signal CLR is provided from the NOR gate 10b, and is coupled to the flag circuit 11b. The flag circuit 11b eliminates latch data having "1" based upon the clear signal CLR.

A circuit for computing the number of words having the above-described structure will now be explained. When data processed by the local MPU 6 is written into the second memory 4 by byte units from an arbitrary location and when the amount of data stored in the second memory 4 exceeds a predetermined value, the local MPU 6 outputs an activation signal SG1 to the DMAC 5. Simultaneously, the local MPU 6 outputs a top address of the written data, a byte position where the first effective data starts within the stored data, and the number of bytes of the effective data together with an activation signal SG1, to the DMAC 5. The DMAC 5 then outputs a request signal SG2 to the host MPU 1 for requesting the usage of bus lines. The host MPU 1 next outputs an acknowledge signal SG3 to the DMAC 5 for permitting the usage of the bus lines, based upon the request signal SG2. When the DMAC 5 receives an acknowledge signal SG3, the DMAC 5 transmits data stored in the second memory 4 to the first memory 2 by one word unit (i.e., four byte units). Simultaneously, the circuit for computing the number of words computes the number of words to be transmitted.

Figure 5A:
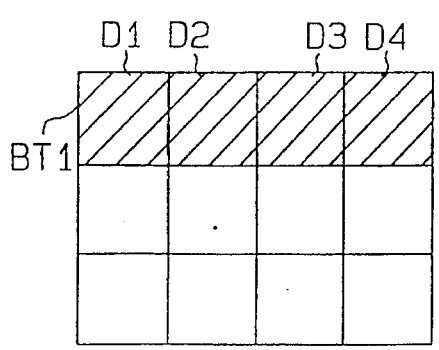
FIGS. 5(a), (b), (c), (d) are explanatory tables that show conditions when data having four bytes are written, respectively.

As shown in FIG. 5(a), when each of the written data D1 through D4 has four bytes and is written from the top byte position BT1 of word, the number of written bytes Bn to be coupled to the circuit for computing the number of words is represented as "100", and the written position signals I, J each become "00". The counter 8 then stores "1", and the latch circuit 7 latches with "00", and the register 14 stores "00". The OR gate 9a outputs an H level signal to the OR gates 9b, based upon the data having an H level output from the counter 8. The OR gate 9b outputs a request signal SG2, based upon the H level input signal. When an output signal from the latch circuit 7 is "00", an output signal from the OR gate 9c goes low, and no flag is set in the flag circuit 11a. The bit conversion circuit 12 converts an input signal having "00" into a signal having "11", and outputs the converted "11" to the adder 13.

The adder 13 adds the output signal having "11" output from the circuit 12 with the output signal having "00" output from the register 14. Since no carry-over is generated during this addition, no flag having "1" is set in the flag circuit 11b. When the DMAC 5 receives an acknowledge signal SG3 from the host MPU 1, based upon the request signal SG3, the DMAC 5 forms the data D1 through D4 having four bytes as one word and transmits the formed word from the second memory 4 to the first memory 2. In the circuit for computing the number of words, the counter 8 subtracts "1" from the stored data, based upon the L level acknowledge signal SG3. Therefore, as the OR gate 9a outputs an L level signal and as all the input signals to the OR gate 9b go low, the OR gate 9b stops outputting the request signal SG2, and terminates the transfer operation.

Figure 5B:
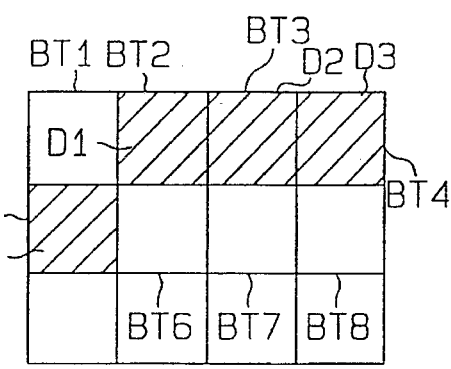

As shown in FIG. 5(b), when each of the written data D1 through D4 having four bytes is sequentially stored in the position starting the second byte position BT2 with respect to the top position, the number of written bytes Bn to be coupled to the circuit for computing the number of words also becomes "100". The written position signals I, J become "01", respectively. Consequently, the counter 8 stores "1", and "00" is latched to the latch circuit 7. Further, the register 14 stores "01". The OR gate 9a outputs an H level signal to the OR gate 9b, based upon the data having "1" output from the counter 8. The OR gate 9b outputs a request signal SG2, based upon the H level inputted signal. Since the output signal from the latch circuit 7 becomes "00", the OR gate 9c outputs an L level signal. Consequently, no flag is set in the flag circuit 11a. Further, the bit conversion circuit 12 converts the input signal having "00" into a respective signal having "11", and outputs the converted signal to the adder 13.

The adder 13 adds the output signal having "11" from the circuit 12 with the output signal having "01" from the register 14. Since a carry-over is generated in this addition, the flag having "1" is set in the flag circuit 11b. When the DMAC 5 receives an acknowledge signal SG3 from the MPU 1, based upon the request signal SG2, the DMAC 5 forms data D1 through D3 having three bytes located in the bytes positions BT1 through BT4 as one word, and transmits the formed word from the second memory 4 to the first memory 2. Further, in the circuit for computing the number of words, the counter 8 subtracts "1" from the stored data, based upon the L level acknowledge signal SG3. Consequently, the OR gate 9a outputs an L level signal. However, if the flag circuit 11b outputs "1" at the time when the acknowledge signal SG3 is coupled thereto, the OR gate 9b keeps outputting a request signal SG2. When an acknowledge signal SG3 is coupled to the DMAC 5, based upon the request signal SG2, the DMAC 5 forms the data D4 having a byte located in the byte positions BT5 through BT8 as one word. The DMAC then transmits the formed word from the second memory 4 to the first memory 2. At this time, since all input signals to the NOR gate 10b are low, a clear signal CLR is coupled to the flag circuit 11b, the flag having "1" in the flag circuit 11b is eliminated, the operation for outputting a request signal SG2 is stopped, and the transfer operation carried by the DMAC 5 is terminated.

Figure 5C:
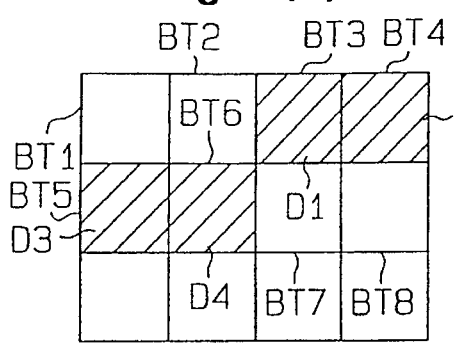
Figure 5D:
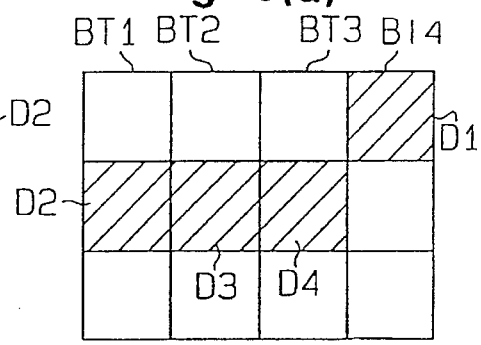

As shown in FIGS. 5(c) and (d), when each of written data D1 through D4 having four bytes is sequentially stored in the position starting either the third or fourth byte positions BT3, BT4 with respect to the top position, the DMAC 5 forms the data D1 through D4 stored in the bytes positions BT1 through BT8 as two words, and transmits the formed words.

Figure 6A:
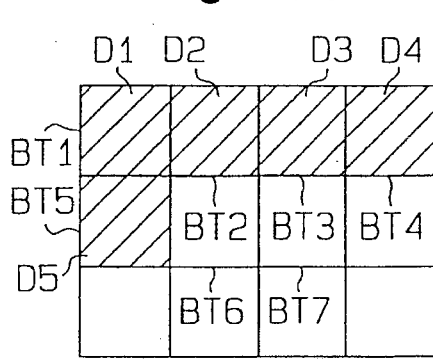
FIGS. 6(a), (b), (c), (d) are explanatory tables that show conditions when data having five bytes are written, respectively.

As shown in FIG. 6(a), when each of written data D1 through D5 having five bytes is sequentially stored in the position starting from the top byte position BT1, the number of written bytes Bn to be coupled to the circuit for computing the number of words becomes "101". Further, the written position signals I, J become "00" respectively. The counter 8 then stores "1", and the latch circuit 7 latches with "01", and further, the register 14 stores "00". The OR gate 9a outputs an H level signal to the OR gates 9b, based upon the data having "1" that is output from the counter 8. The OR gate 9b outputs a request signal SG2, based upon the H level input signal. Since an output signal from the latch circuit 7 becomes "01", an output signal from the OR gate 9c goes high, so that flag having "1" is set in the flag circuit 11a. The bit conversion circuit 12 converts an input signal having "01" into a respective signal having "00", and outputs the converted "00" to the adder 13.

Figure 6B:
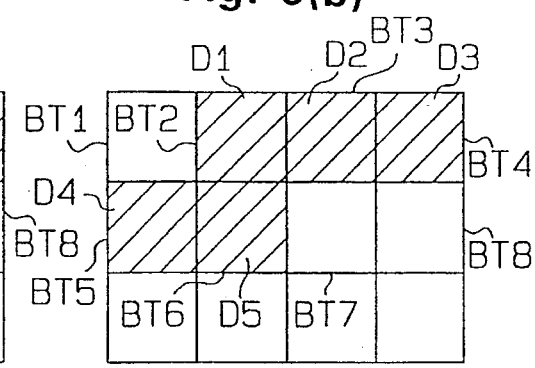
Figure 6C:
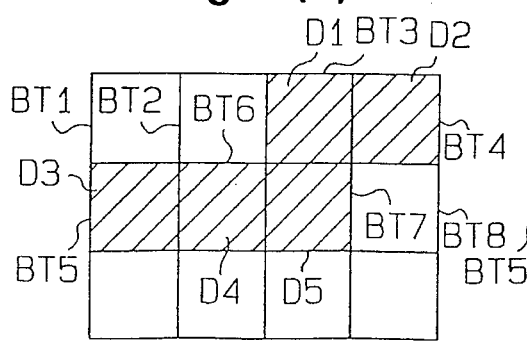
Figure 6D:
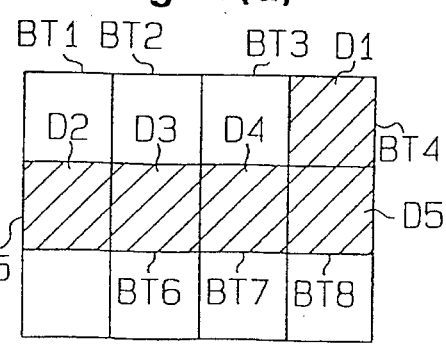

The adder 13 adds the output signal having "00" from the circuit 12 with the output signal having "00" from the register 14. Since no carry-over is generated in this addition, no flag is set in the flag circuit 11b. When the DMAC 5 receives an acknowledge signal SG3 from the MPU 1, based upon the request signal SG2, the DMAC 5 forms the data D1 through D4 having four bytes that are located in the bytes positions BT1 through BT4 as one word, and transmits the formed word from the second memory 4 to the first memory 2. Further, in the circuit for computing the number of words, the counter 8 subtracts "1" from the stored data, based upon the L level acknowledge signal SG3. Consequently, the OR gate 9a outputs an L level signal, however, as the flag circuit 11b is outputting "1" at the time when the acknowledge signal SG3 is coupled thereto, the OR gate 9b keeps outputting a request signal SG2. When an acknowledge signal SG3 is coupled to the DMAC 5, based upon the request signal SG2, the DMAC 5 forms the data D5 having a byte that is located in the byte positions BT5 through BT8 as one word, and transmits the formed word from the second memory 4 to the first memory 2. At this time, as all input signals to the NOR gate 10b are low, a clear signal CLR is coupled to the flag circuit 11a. Further, as the flag having "1" in the flag circuit 11a is eliminated, the operation for outputting a request signal SG2 is stopped, and the transfer operation carried by the DMAC 5 is terminated. As shown in FIGS. 6(b) through (d), even when the written positions of data D1 through D5 having five bytes are altered, the DMAC 5 carries out the operation for transferring two words, based upon the operation of the circuit for computing the number of words.

Figure 7A:
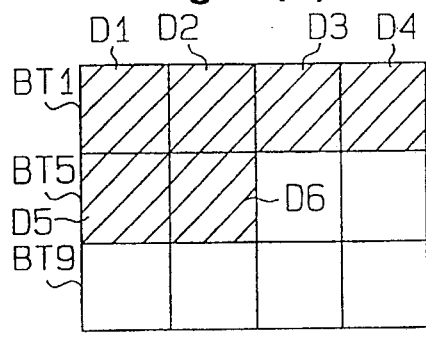
FIGS. 7(a), (b), (c), (d) are explanatory tables that show conditions when data having six bytes are written, respectively.

As shown in FIG. 7(a), when each of written data D1 through D6 having six bytes is sequentially stored in the position starting from the top byte position BT1, the number of written bytes Bn to be coupled to the circuit for computing the number of words becomes "110". Further, the written position signals I, J become "00", respectively. The counter 8 then stores "1", and the latch circuit 7 latches with "10", and further, the register 14 stores "00". The OR gate 9a outputs an H level signal to the OR gates 9b, based upon the data having "1" that is output from the counter 8. The OR gate 9b outputs a request signal SG2, based upon the H level input signal. Since an output signal from the latch circuit 7 becomes "10", an output signal from the OR gate 9c goes high, so that flag having "1" is set in the flag circuit 11a. The bit conversion circuit 12 converts an input signal having "10" into a respective signal having "01", and outputs the converted "01" to the adder 13.

Figure 7B:
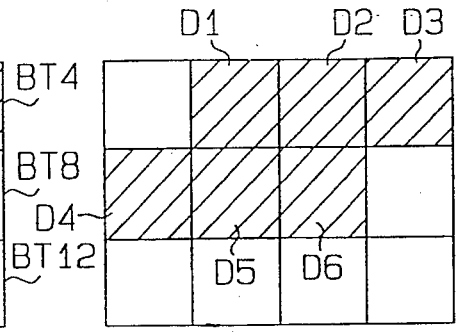
Figure 7C:
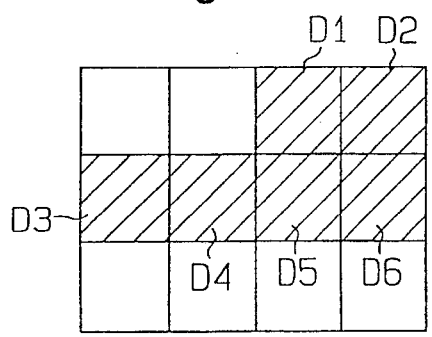

The adder 13 adds the output signal having "01" from the circuit 12 with the output signal having "00" from the register 14. Since no carry-over is generated in this addition, no flag is set in the flag circuit 11b. When the DMAC 5 receives an acknowledge signal SG3 from the MPU 1, based upon the request signal SG2, the DMAC 5 forms the data D1 through D4 having four bytes that are located in the bytes positions BT1 through BT4 as one word, and transmits the formed word from the second memory 4 to the first memory 2. Further, in the circuit for computing the number of words, the counter 8 subtracts "1" from the stored data, based upon the L level acknowledge signal SG3. Consequently, the OR gate 9a outputs an L level signal. However, when the flag circuit 11a outputs "1" and when the acknowledge signal SG3 is coupled thereto, the OR gate 9b keeps outputting a request signal SG2. When an acknowledge signal SG3 is coupled to the DMAC 5, based upon the request signal SG2, the DMAC 5 forms the data D5, D6 having two bytes that are located in the byte positions BT5 through BT8 as one word, and transmits the formed word from the second memory 4 to the first memory 2. At this time, all the input signals to the NOR gate 10b are low, and a clear signal CLR is coupled to the flag circuit 11a. Further, as the flag having "1" in the flag circuit 11a has been eliminated, the operation for outputting a request signal SG2 is stopped, and the transferring operation carried by the DMAC 5 is terminated. As shown in FIGS. 7(b) and (c), even when the written in positions of data D1 through D6 having six bytes are altered, the DMAC 5 carries out the operation for transferring two words, based upon the operation of the circuit for computing the number of words.

Figure 7D:
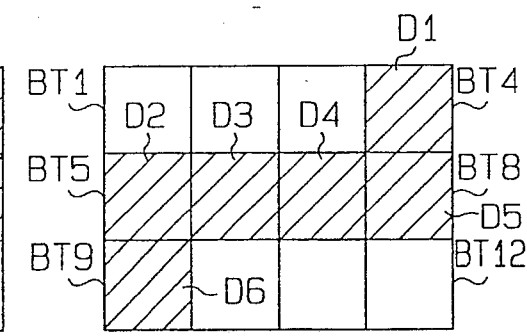

As shown in FIG. 7(d), when each of written data D1 through D6 having six bytes is sequentially stored in the position starting from the fourth byte position BT4, the number of written bytes Bn to be coupled to the circuit for computing the number of words becomes "110". Further, the written position signals I, J become "11", respectively. The counter 8 then stores "1", and the latch circuit 7 latches with "10", and further, the register 14 stores "11". The OR gate 9a outputs an H level signal to the OR gates 9b, based upon the data having "1" that is output from the counter 8. The OR gate 9b outputs a request signal SG2, based upon the H level inputted signal. Since an output signal from the latch circuit 7 becomes "10", an output signal from the OR gate 9c goes high, so that flag having "1" is set in the flag circuit 11a. The bit conversion circuit 12 converts an input signal having "10" into a signal having "01", and outputs the converted "01" to the adder 13.

The adder 13 adds the output signal having "01" from the circuit 12 with the output signal having "11" from the register 14. Since a carry-over is generated according to this addition, a flag having "1" is set in the flag circuit 11b. When the DMAC 5 receives an acknowledge signal SG3 from the MPU 1, based upon the request signal SG2, the DMAC 5 forms the data D1 having one byte that is located in the bytes positions BT1 through BT4 as one word, and transmits the formed word from the second memory 4 to the first memory 2. Further, in the circuit for computing the number of words, the counter 8 subtracts "1" from the stored data, based upon the L level acknowledge signal SG3. Consequently, the OR gate 9a outputs an L level signal. However, when the flag circuit 11a outputs "1" and when the acknowledge signal SG3 is coupled thereto, the OR gate 9b keeps outputting a request signal SG2. When an acknowledge signal SG3 is coupled to the DMAC 5, based upon the request signal SG2, the DMAC 5 forms the data D2 through D5 having four bytes located in the byte positions BT5 through BT8 as one word, and transmits the formed word from the second memory 4 to the first memory 2. At this time, as all input signals to the NOR gate 10b have an L level, and a clear signal CLR is coupled to the flag circuit 11a. Since the flag having "1" in the flag circuit 11a is eliminated and since the flag circuit 11b keeps outputting a flag having "1", the OR gate 9b also keeps outputting a request signal SG2.

When an acknowledge signal SG3 is coupled to the DMAC 5 again, based upon the request signal SG2, the DMAC 5 forms the data D6 having one byte located in the bytes positions BT9 through BT12 as one word, and transmits the formed word from the second memory 4 to the first memory 2. At this time, as all input signals to the NOR gate 10b have an L level, and a clear signal CLR is coupled to the flag circuit 11b. Since the flag having "1" in the flag circuit 11b has been eliminated, and since the flag circuit 11b keeps outputting a flag having "1", the OR gate 9b stops outputting a request signal SG2. Further, the DMAC 5 terminates the operation for transferring data. Therefore, as shown in FIG. 7(d), when each of written data D1 through D6 having six bytes is sequentially stored in the position starting from the fourth byte position BT4, the DMAC 5 forms the data D1 through D6 as three words, and transmits the formed words.

Figure 8A:
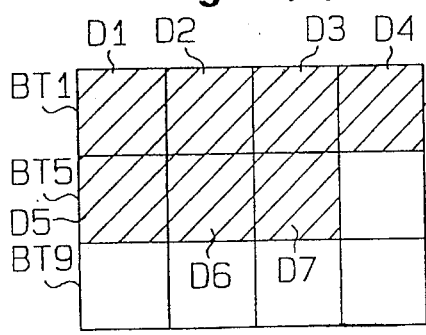
FIGS. 8(a), (b), (c), (d) are explanatory tables that show conditions when data having seven bytes are written, respectively.
Figure 8B:
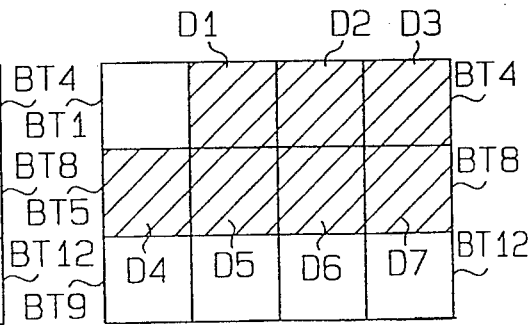
Figure 8C:
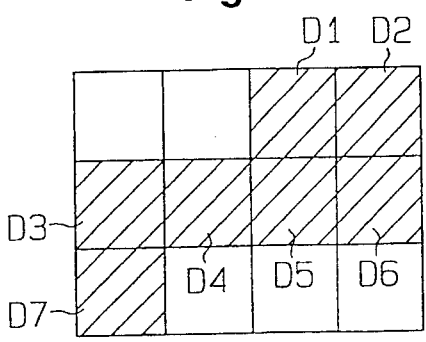
Figure 8D:
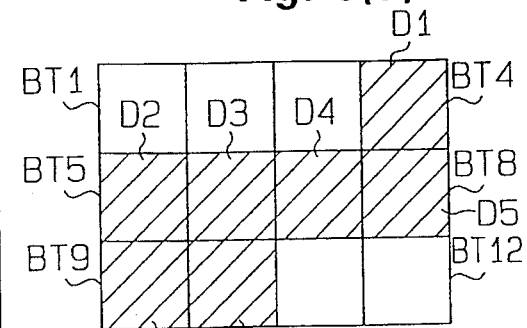

As shown in FIGS. 8(a), 8(b), 8(c) and 8(d), when each of written data D1 through D7 having seven bytes is sequentially stored in the byte positions shown in FIGS. 8(a) and (b), those data D1 through D7 are reformed as two words through the above-described manner, and the reformed words are transmitted. When those data are written in the byte positions as shown in FIGS. 8(c) and (d), those data D1 through D7 are reformed as three words through the above-described manner, and the reformed words are transmitted.

Figures 9, 10:
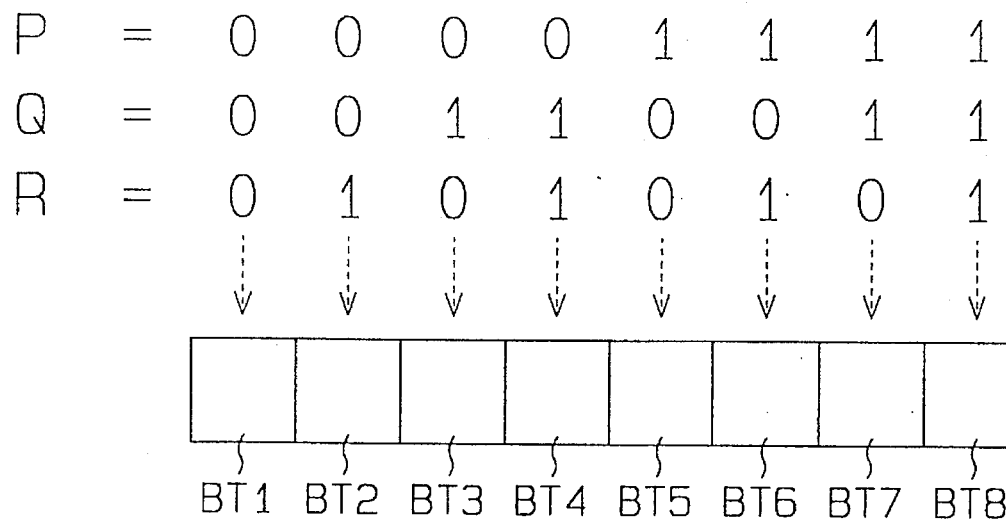
FIG. 9 is an explanatory conversion table for generating a signal for determining a written location that is utilized when one word is formed with eight bytes.
FIG. 10 is an explanatory conversion table for a bit converting circuit that is utilized when one word is formed with eight bytes.

According to the above-described embodiment, four bytes form one word, and the formed word is transmitted in this structure. For example, when eight bytes form one word, and the formed word is to be transmitted, the structure of the circuit for computing the number of words will act as follows. The lower three bits of signal Bn that represents the number of written bytes is coupled to the latch circuit 7. The remainder portion of the upper bits of the signal Bn are coupled to the down counter 8. As shown in FIG. 9, a set of signals P, Q, R representing the written positions with respect to each of the byte positions BT1 through BT8 to be written is coupled to the register 14, respectively. The bit conversion circuit 12 converts the lower three bits of the signal Bn into respective signals X, Y, Z, as shown in FIG. 10. The circuit for computing the number of words that has the above-described structure computes the number of words, based upon the byte number Bn for to be written and the signals P, Q, R for written positions, and carries out the transfer data operation.

According to the above-described invention, a circuit for computing the number of words is provided that can output a request signal SG2 to initiate a transfer operation of data having a certain number of words, based upon the signal Bn representing the number of written bytes and the signal representing the written position. Further, the structure of this circuit is very simple.

Although only one embodiment of the present invention has been described in detail herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A data transfer apparatus for transferring digital data in a data processing system, said digital data comprising at least one word, said at least one word including $2^n$ bytes of binary data, where n is an integer, and having n lower bits and a remainder number of upper bits, said apparatus comprising:

a plurality of storage devices storing words of said digital data and to which said digital data is written and from which said digital data is read;

a central processing unit controlling transfer of said digital data;

a bus connecting said central processing unit and each of said plurality of storage devices; and a transfer device connected to said bus and controlled by said central processing unit to execute the transfer of said digital data, said transfer device including a calculator to calculate a number of words of said digital data to be transferred according to the number of bytes contained in each of said words, and a byte position occupied by said bytes within said words, said byte position being determined by said central processing unit which provides an n bit value corresponding to said byte position, said calculator including, a first calculator circuit to calculate a number of words formed by said binary data, based on said upper and said lower bits of said binary data, a second calculator circuit to add "1" to said number of words calculated by said first calculator circuit when the value of said n lower bits is not "0", and a third calculator circuit to add "1" to said number of words calculated by said first calculator circuit when an addition of said n lower bits to said n bit value results in a bit carry-over.

2. An apparatus according to claim 1, wherein said central processing unit includes a host Micro Processing Unit (MPU) and a local MPU.

3. An apparatus according to claim 1, wherein said plurality of storage devices include a first memory and a second memory.

4. An apparatus according to claim 1, wherein said transfer device comprises a Direct Memory Access Controller (DMAC).

5. An apparatus for transferring digital data in a data processing system, said digital data comprising at least one word, said at least one word including $2^n$ bytes, where n is an integer and where each word has a corresponding number "n" of lower bits and a remainder number of upper bits, said apparatus comprising:

a host Micro Processing Unit (MPU) and a local MPU each controlling transfer of said digital data, said local MPU providing an "n" bit value corresponding to a position of said bytes within said at least one word;

a Direct Memory Access Controller (DMAC) executing the transfer of said digital data based on said host MPU and said local MPU;

a first memory and a second memory to which said data transferred by said DMAC is written and from which said data transferred by said DMAC is read;

a bus connecting said host MPU, said local MPU, said DMAC, said first memory and said second memory;

wherein said DMAC includes a first calculator circuit calculating a number of words formed by said digital data, based on said upper and said lower bits of said binary data, a second calculator circuit adding "1" to said number of words calculated by said first calculator circuit when the value of said "n" lower bits is not "0", and a third calculator circuit adding "1" to said number of words calculated by said first calculator circuit when an addition of said "n" lower bits to said "n" bit value results in a bit carry-over.

6. An apparatus according to claim 5, wherein said first calculator circuit includes a down counter.

7. An apparatus according to claim 5, wherein said second calculator circuit includes a latch circuit.

8. An apparatus according to claim 5, wherein said third calculator circuit includes an adder.

9. An apparatus for transferring digital data in a data processing system, said digital data comprising at least one word, said at least one word including $2^n$ bytes, where n is an integer, and where each word has a corresponding number "n" of lower bits and a remainder number of upper bits, said apparatus comprising:

a host Micro Processing Unit (MPU) and a local MPU each controlling transfer of said digital data, said local MPU providing an "n" bit value corresponding to the position of said bytes within said at least one word;

a Direct Memory Access Controller (DMAC) executing the transfer of said digital data based on said host and said local MPU;

a first memory and a second memory to which said data transferred by said DMAC is written and from which data transferred by said DMAC is read;

a bus connecting said host MPU, said local MPU, said DMAC, said first memory and said second memory;

a first calculator circuit receiving a value representative of said upper bits of said binary data from said local MPU, said first calculator circuit including a down counter subtracting "1" from said upper bit value in response to an acknowledge signal from said host MPU, said first calculator circuit further calculating a number of words formed by said binary data and providing a signal representative thereof;

a second calculator circuit, including a latch circuit, receiving a value representative of said "n" lower bits of said binary data and incrementing said value representative of said "n" lower bits in response to said signal representative of said number of words formed by said binary data from said first calculator circuit; and a third calculator circuit adding "1" to said number of words calculated by said first calculator circuit when an addition of said "n" lower bits and said "n" bit value results in a bit carry-over.

* * * * *